United States Patent [19]

Donelli

[11] 4,039,739
[45] Aug. 2, 1977

[54] RADIOACTIVE LIGHTNING CONDUCTOR WITH IONIZED-GAS CURRENT

[76] Inventor: Benedetto Luigi Donelli, Via Pergolesi, 26, 20124 Milan, Italy

[21] Appl. No.: 602,924

[22] Filed: Aug. 8, 1975

[30] Foreign Application Priority Data

Sept. 13, 1974 Italy .................................. 27264/74

[51] Int. Cl.² .................... H02G 13/00; H05F 3/06
[52] U.S. Cl. .................................... 174/4 C; 361/230
[58] Field of Search .................. 174/2, 3, 4 R, 4 C; 313/54; 317/4, 61, 262 AE

[56] References Cited

U.S. PATENT DOCUMENTS

| | | | |
|---|---|---|---|
| 2,594,777 | 4/1952 | Hicks | 317/4 |
| 2,815,395 | 12/1957 | Donelli | 174/4 C |
| 2,854,499 | 9/1958 | Capart | 174/4 C |
| 2,928,941 | 3/1960 | Hicks et al. | 317/4 |
| 3,292,042 | 12/1966 | Michener et al. | 317/262 AE X |

*Primary Examiner*—Laramie E. Askin
*Attorney, Agent, or Firm*—Stevens, Davis, Miller & Mosher

[57] ABSTRACT

Structure of radioactive lightning conductor comprising, associated to the metal lightning rod, an insulator body acting as support for a source of radioactive emissions, said source being contained inside a container, which forms a chamber sealed against the direct outlet of radioactive emission, but which has openings of connection with the outward air, the chamber of said container being further connected to a gas source, apt to produce a gas flow from the inside to the outside of said container, through said openings.

8 Claims, 3 Drawing Figures

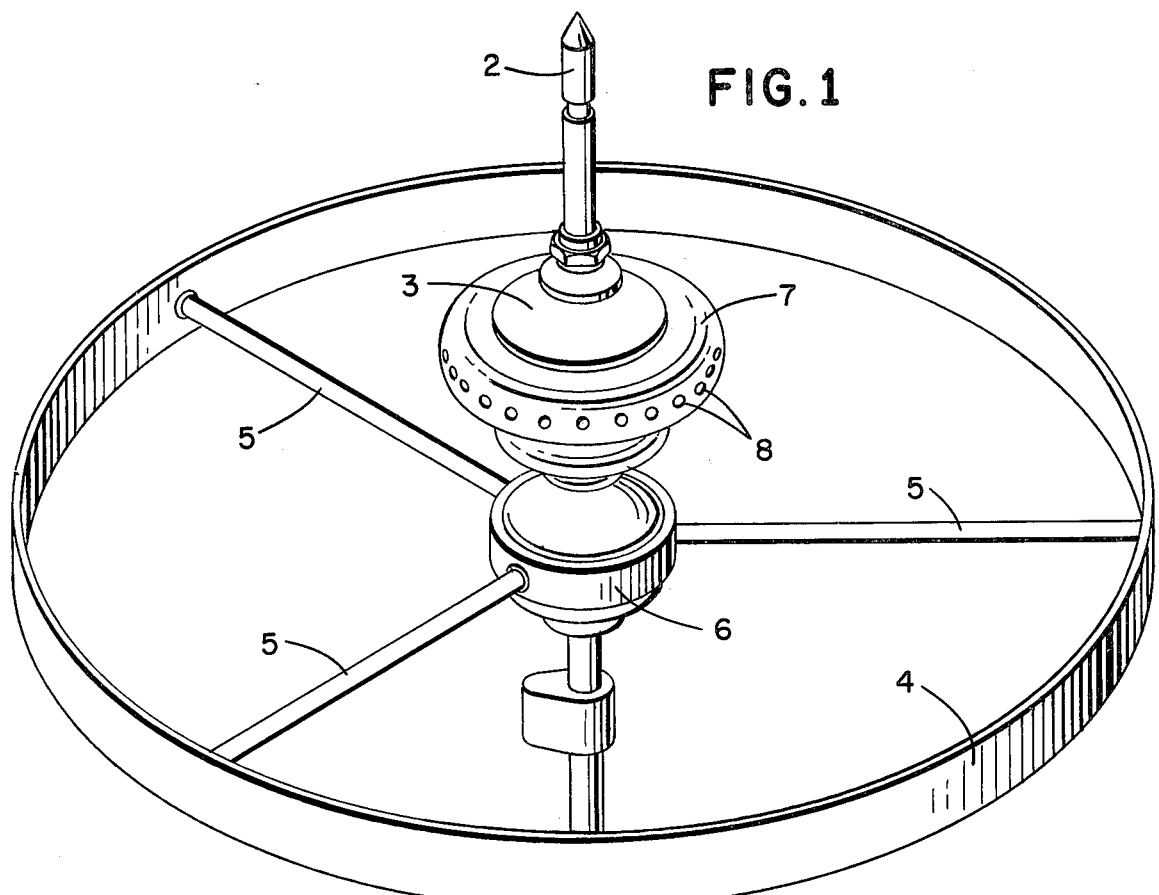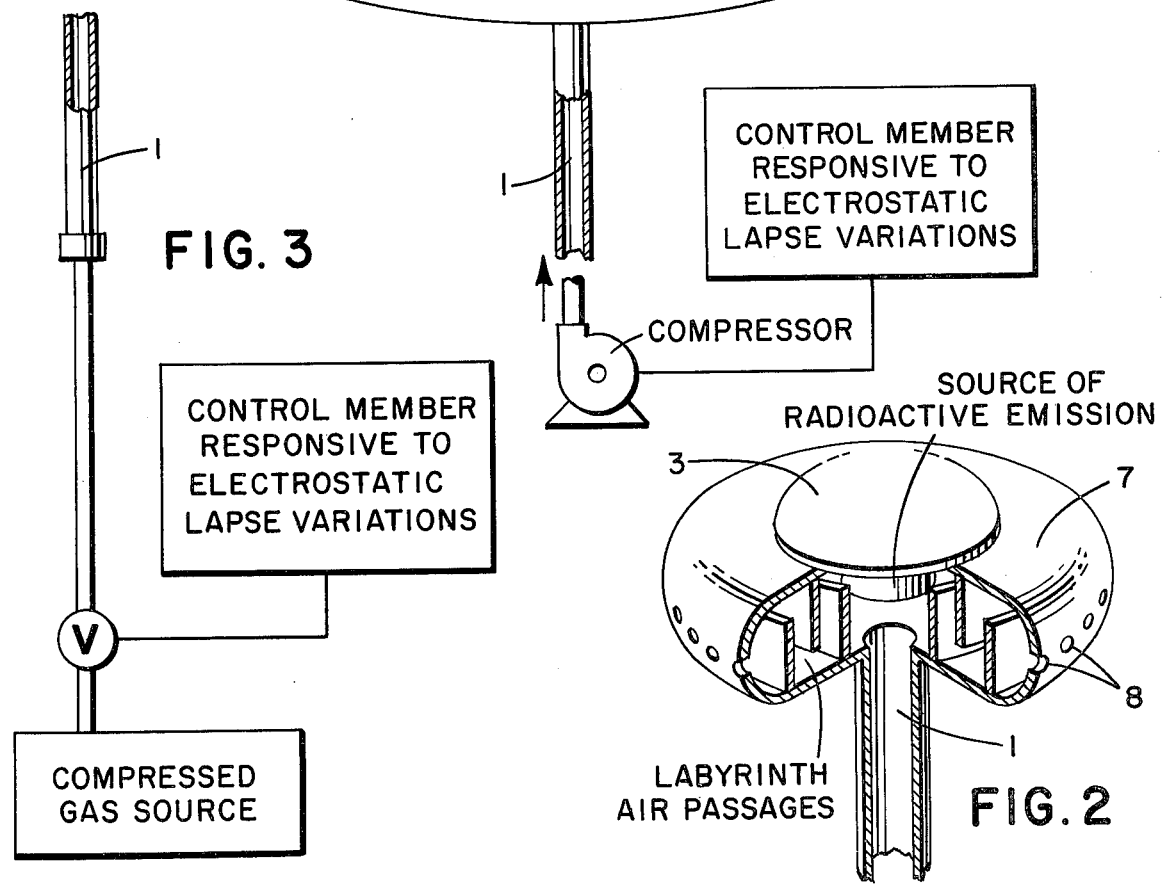

RADIOACTIVE LIGHTNING CONDUCTOR WITH IONIZED-GAS CURRENT

BACKGROUND OF THE INVENTION

1. Field of the Invention

The object of the present invention is an improved structure of lightning conductor with ionization field, briefly named "radioactive lightning conductor", that is, a lightning conductor wherein the ionization of air surrounding the tip is favoured by radiations, particularly alpha radiations, emitted by radioactive bodies usually in the form of metal strip segments, placed in proximity of the tip itself.

2. Description of the Prior Art

Lightning conductors of this type are already widely known since several years and they form the object, for example, of Italian Pat. No. 487,637 and the respective patents of addition Italian Pat. Nos. 736,138 and 800,082. This last patent, in particular, points out the importance of using Americium 241 as a radioactive substance, the latter having an emission which is exceptionally stable in time and, above all, almost exclusively limited to alpha radiations.

Alpha radiations actually have the advantage, on one hand, to cause a practically negligible air pollution, and on the other hand, of having a high ionizing effect.

According to the same Italian Pat. No. 800,082, the radioactive substance Americium 241 is held into flat, metal containers, the walls of which do not influence outward alpha emission, preventing on the other hand the abrasive action of atmospheric agents, particularly wind, from carrying along in the air particles of radioactive material.

The aforespecified containers are usually applied on the upper surface of an insulator body, associated to the lightning rod and close to its tip, as described in the same Italian Pat. No. 800,082, or even in the already cited Italian Pat. No. 736,138.

In spite of the fact that, with the aforespecified precautions — namely, the use of a radioactive substance, such as Americium 241, closed inside metal containers — the pollution determined by the radioactive emission is exceptionally modest, it has however been made to observe that, in practice, said emission is not eliminated (considering the notably long life of such radioactive substances), whereby, as time passes, a progressive pollution takes place, which may reach even appreciable, and hence dangerous levels.

SUMMARY OF THE INVENTION

The object of the present invention is to actually eliminate entirely any radioactive emission in lightning conductors of the above mentioned type. Said result is obtained due to the fact that the radioactive substance — such as, for example, the actual Americium 241 — is contained inside a container, which forms a chamber sealed against the direct outlet of radioactive emissions, but which has openings of connection with the air surrounding said container outwardly, said chamber being further connected to a gas source, apt to produce a gas flow running from said chamber outwardly, through said openings.

By this construction — as can be easily understood — the radioactive substance creates an emission, particularly of alpha particles, within the chamber itself, without said emission being able to reach the outer part and hence preventing the forming of the slightest pollution. Said emission produces however, always within the chamber of the container, a highly ionized gas medium. This gas medium — which may evidently just be air — is pushed outwardly, through said openings, due to said gas flow, thereby producing like an ionized-air cloud, or ionized-gas cloud, all around the container.

BRIEF DESCRIPTION OF THE DRAWING

Further characteristics and advantages of the lightning conductor structure according to the present invention will appear evident from the following description, given with reference to the non-limiting accompanying drawings in which:

FIG. 1 shows a perspective view of the lightning conductor of the present invention;

FIG. 2 shows a break-away view of the interior of the radioactive substance container; and FIG. 3 shows a further embodiment of the invention.

DESCRIPTION OF THE PREFERRED EMBODIMENT

As shown in FIGS. 1 and 2 — and in a substantially known manner — onto a lightning rod 1, and close to its tip 2, is fixed an insulator body 3.

A metal ring 4, exciting the atmosphere, surrounds the rod 1 and is supported by radial bars 5 being fixed onto a central support 6, which is in turn insulated from the rod 1.

On the insulator body 3 is mounted a tubular ring 7, inside of which is contained the radioactive substance. The ring 7 has a plurality of openings 8, for example in the form of tiny holes, which create an air connection between the inner part and the outer part of the actual tubular ring 7. Inside the ring 7 there are further provided, in correspondence of said openings 8, labyrinth passages (FIG. 2) or the like, which allow a free passage of air, but which prevent any outlet of radioactive emission, particularly an outlet of alpha particles.

The inner chamber of the ring 7 is connected — for example through the actual rod 1, which may be hollow — with a gas source, for example a small air compressor.

As already said, the alpha particle emission inside the chamber formed by the tubular ring 7, creates a highly ionized atmosphere inside the tubular ring itself. Whereby, when compressed air or even some other gas under pressure, is fed through the rod 1 and enters the chamber of the ring 7, the ionized atmosphere contained therein is pushed outwardly, through the openings 8. Hence, like a cloud of ionized air or gas, is formed all around the ring 7, which is just what should take place for a correct working of the lightning conductor.

When producing the above device, it is important for the water — essentially rain, from whichever direction it comes — not to be able to penetrate through the openings 8, since this could contaminate it, and the eventual subsequent outlet thereof could lead to that pollution which is just what one wishes to avoid. For this purpose, it may be sufficient to arrange said openings in a position — for example in the lower part, turning downwards, of the ring 7 — such that the water may not penetrate therein, or better, to create a protection against the rain — for example, through a suitable covering (not shown) — so that the water may not fall onto the ring 7, or at least onto that part thereof which is provided with openings.

For what concerns the feeding of air, or of compressed gas, it is possible to use any known system, which may be selected each time, according to the area whereon the lightning conductor is applied.

In fact, if the lightning conductor is mounted onto a factory, or generally onto an establishment where there is already a compressed gas source available for other uses, it will be sufficient to connect said source with the feed pipe passing through the rod 1 towards the ring 7, interposing on said feed pipe a control valve.

If, viceversa, the lightning conductor is mounted onto a house, or generally onto a place where on compressed air is available, it will be possible to associate to the feed pipe passing through the rod 1, a small compressor — or, for example, even a fan — with sufficient delivery to fulfil the required purpose.

In either case — in order to avoid wasting energy — it will be appropriate to associate to the aforecited control valve, or respectively, to the delivery compressor, a control member working in response to a determined value of the electrostatic lapse. In this way, on approaching of a storm, when the electrostatic lapse rises and reaches the predetermined value, said control member opens the control valve, or respectively, starts the compressor, hence causing air or gas to be fed towards the ring 7. Consequently, the forming of the aforecited ionized-air or ionized-gas cloud will take place only when actually required, that is, on approaching of or during a storm.

Since both the control valve and the compressor, as well as the actual control member acting in response to the electrostatic lapse, normally work on electricity, it is important to anticipate the fact that the electric feeding may be cut off, which is fairly frequent during a storm. It will hence be preferable for the above members to be fed through a battery system, eventually connected to an automatic recharge system. Electric feeding units of this type are already known and it is hence found unnecessary to have to give a more detailed description thereof.

It is anyhow understood that the invention is not limited to the particular embodiment described, but that there may be various modifications thereof — both in the structure of the chamber containing the radioactive substance, and in the system for feeding and forming the ionized-gas cloud, as well as in the choice of this actual gas — without thereby departing from the scope of the invention itself.

I claim:

1. A radioactive lightning conductor comprising a rod, an insulator body surrounding said rod, a container supported by said body having openings therein, a source of radioactive emissions positioned within said container but sealed against the direct outlet of radioactive emission and means to introduce a gas source to the interior of the container to cause gas flow from the interior of the container to the outside thereof through said openings.

2. The conductor of claim 1, wherein said container consists of a tubular body in the form of a ring, surrounding said insulator body.

3. The conductor of claim 1, wherein said openings consist of tiny holes made into the walls of the container, inside which container — in correspondence of said holes — are provided labyrinth air passages, preventing the outlet of radioactive emission.

4. The conductor of claim 1, wherein said openings are in an area of the container which cannot be reached by the rain.

5. The conductor of claim 4 including a protective covering for protecting said openings.

6. The conductor of claim 1, wherein said means includes a control valve and a control member operating said valve to control gas flow to said container.

7. The conductor of claim 6, wherein said control member consists of a device sensitive to electrostatic lapse variations which acts in response to the reaching of a predetermined value of said electrostatic lapse.

8. The conductor of claim 1, including a gas source connected to said means to introduce gas into said container and a control member to operate said gas source.

* * * * *